United States Patent Office 3,721,662
Patented Mar. 20, 1973

3,721,662
METHOD FOR PRODUCING AN ACTIVE
CARBOXYLIC ACID ESTER
Masahiko Fujino, Hyogo, and Chitoshi Hatanaka, Suita, Japan, assignors to Takeda Chemical Industries, Ltd., Osaka, Japan
No Drawing. Filed Feb. 2, 1968, Ser. No. 702,555
Claims priority, application Japan, Feb. 4, 1967, 42/7,401; June 26, 1967, 42/40,900
Int. Cl. C07c 67/02, 103/52
U.S. Cl. 260—112.5                 7 Claims

ABSTRACT OF THE DISCLOSURE

An active carboxylic acid ester of the formula

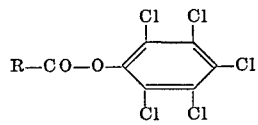

useful in the synthesis of peptide, is prepared by reacting formic acid, certain hydrocarbon-carboxylic acids, N-protected amino acids or a peptide with protected terminal amino group with pentachlorophenyl dichloroacetate or pentachlorophenyl trichloroacetate, in the presence of a tertiary amine or dicyclohexylamine.

This invention relates to a method for producing active carboxylic acid esters that are useful reagents, for example, for peptide synthesis.

The method of this invention more particularly comprises reacting (a) a carboxylic acid

in which each radical attached to the carbon atom of the α-position is weaker than Cl in electronegativity and which is selected from the group consisting of (1) formic acid or a hydrocarbon-carboxylic acid having at most 20 carbon atoms, (2) N-protected amino acids and (3) a peptide in which the terminal amino is protected, with (b) a chlorinated acetic acid ester of the formula:

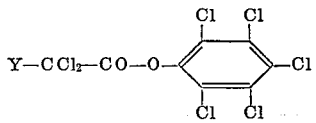

wherein Y stands for H or Cl, in the presence of a tertiary amine or dicyclohexylamine, whereby the corresponding carboxylic acid ester of the formula:

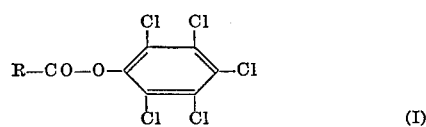

wherein R—CO— is an acyl of a carboxylic acid defined as above, is produced.

Hitherto, a method for producing various active esters of carboxylic acid using the trifluoroacetates of various phenols has been provided by Sakakibara et al. (S. Sakakibara, N. Inukai: Bull. Chem. Soc. Japan, 37, 1231 (1964); Ibid 38, 1979 (1965)).

However, the use of the trifluoroacetates of phenols is bound up with disadvantages, such as instability of the reagents and expensiveness of the trifluoroacetic anhydride required for the preparation of the reagent.

It is a principal object of the present invention to provide a new and excellent method for producing compounds (I), which are useful as intermediates for the synthesis of peptides.

A further object is to provide a new and industrially advantageous means for producing peptides.

These objects are realized according to this invention which is based on the unexpected finding that the compounds of Formula I are quite useful as reagents for ester exchange reactions, and especially for the synthesis of peptides.

Moreover, the compounds (I) are easily prepared as stable crystals, and do not decompose even when stored for several months at room temperature.

According to the invention, a compound (I) reacts smoothly and completely with an amine salt of a carboxylic acid in an organic solvent at room temperature to give an excellent yield of the desired product.

In accordance with the present invention, pentachlorophenylester represented by the Formula I is prepared by reacting a carboxylic acid of the formula

R—COOH                (II)

wherein R—CO— has previously recited significance, with a chlorinated acetic acid ester of the formula

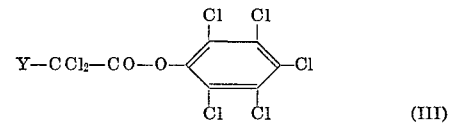

wherein Y has the previously recited significance, in the presence of a tertiary amine or dicyclohexylamine. The use of such amines instead of pyridine, the latter being generally used in the known methods, also provides an improved yield of the objective active esters.

One of the starting materials in this method is, as stated above, a compound of the Formula II. For the employable carboxylic acid it is required that each radical attached to the carbon atom of the α-position be weaker than Cl in electronegativity at the α-position of the carboxylic acid:

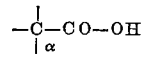

The compounds represented by the Formula II comprise formic acid and hydrocarbon-carboxylic acids having at most 20 carbon atoms such as acrylic acid, vinylacetic acid, phenylacetic acid, acetic acid, phenylbutyric acid, capric acid, lauric acid, myristic acid, palmitic acid, stearic acid, arachidic acid, oleic acid, etc.

Amino acid which constitutes the N-protected amino acid is exemplified by glycine, alanine, valine, norvaline, leucine, norleucine, isoleucine, serine, threonine, cysteine, cystine, methionine, phenylalanine, tyrosine, diiodotyrosine, tryptophane, aspartic acid, glutamic acid, hydroxyglutamic acid, arginine, lysine, hydroxylysine, histidine, ornithine, citruline, canavanine, proline, hydroxyproline, etc.

A peptide composed of two or more of said amino acids with or without the said hydrocarbon carboxylic acid can also be employed as the starting carboxylic acid in the method of the present invention, in a protected form at the terminal amino group or groups.

The term "N-protected" or "protected" at the terminal amino means that the free amino or active imino which is essential in amino acids or their peptides has been protected. The N-protecting group of said amino acids or peptides is generally selected among those groups which are usually employed for protecting amino groups of the amino acids, particularly in peptide syntheses, and include, for example, carbobenzyloxy (benzyloxycarbonyl), t-butoxycarbonyl, t - amyloxycarbonyl, triphenylmethyl, formyl, phthaloyl, benzyl, etc.

When the N-protected amino acid or the peptide contains in its molecule an active hydrogen-containing functional group or groups such as —OH, —SH and =NH further to —NH$_2$ or active >NH, the reaction of the present invention is preferably carried out by protecting beforehand the functional group or groups with such a protecting group as mentioned as the N-protecting group.

When the hydrocarbon-carboxylic acid or the N-protected amino acid or the peptide contains in its molecule one or more surplus carboxyl groups at which the esterification is not desired or intended to take place, such surplus carboxyl group or groups are preferably protected beforehand by one of those groups which are generally employed for protecting a carboxyl group in chemical reaction particularly in peptide syntheses, such protected carboxyl group being exemplified by methoxycarbonyl, ethoxycarbonyl, benzyloxycarbonyl, t-butoxycarbonyl, phenoxycarbonyl, etc.

Another starting material in this process is a compound of the foregoing Formula III, i.e. pentachlorophenyl dichloroacetate or pentachlorophenyl trichloroacetate, which is easily and cheaply available.

The reaction of the present invention is carried out in an inert organic solvent in the presence of a tertiary amine or dicyclohexylamine.

Inert organic solvents which are advantageously used in this method, include non-polar organic solvent such as dimethylformamide, dioxane, ether, benzene etc.

The tertiary amines can be exmplified, for example, by aliphatic, aromatic or alicyclic tertiary amines having at most 15 carbon atoms such as trimethylamine, triethylamine, tributylamine, N,N'-dialkylbenzylamine (e.g. N, N'-dimethylbenzylamine, N,N'-diethylbenzylamine, etc.), N,N'-dialkylaniline (e.g. N,N'-dimethylaniline, N,N'-diethylaniline, etc.), N-alkylpyrrolidine (e.g. N-methylpyrrolidine, N-ethylpyrrolidine, etc.), N-alkylpiperidine (e.g. N-methylpiperidine, N-ethylpiperidine, etc.), N-alkylmorpholine (e.g. N-methylmorpholine, N-methylmorpholine, etc.), etc.

The reaction proceeds at room temperature (about 15° C. to about 25° C.) and if desired may be carried out under cooling.

The reaction time required varies with the kind of compound (III) and the reaction temperature. Generally, the reaction time required is about from 2 minutes to 3 hours, advantageously from 2 to 30 minutes.

Thus, an active carboxylic acid ester represented by the Formula I is obtained and this compound can be used, if desired, for the synthesis of peptide.

Concrete examples of the application of the active carboxylic acid esters thus produced to the synthesis of known and useful peptides are shown in References 1 and 2 hereinafter.

In the reaction of the present invention, since the reaction occurs as part of the same reaction system as the production of the active ester, the peptides are obtained in better yield compared with hitherto known method for the synthesis of peptides.

The following working examples and references illustrate the invention.

In the examples and references, "g.," "mg.," "ml.," "A" and "B" are "gram," "milligram," "milliliter," "pentachlorophenyl trichloroacetate" and "pentachlorophenyl dichloroacetate," respectively.

EXAMPLE 1

To a solution of 0.01 mol of a compound (II) in 10 ml. of dimethyl formamide, there is added 0.01 mol of triethylamine or N-ethylpiperidine at 0° to 5° C.

To the mixture, there is added 0.01 mol of compound (III) under stirring, and the mixture is stirred at room temperature (about 15° to 25° C.) for a period of time ranging from 2 minutes to 3 hours as shown in Table 1.

To this-treated mixture, 20 to 30 ml. of water is added under cooling to precipitate compound (I) in a crude state, which is recovered by filtration.

Instead of the addition of water, the reaction mixture can be extracted with ethyl acetate. The ethyl acetate extracts are then washed with water, 5% aqueous sodium bicarbonate solution and normal hydrochloric acid, in that order, dehydrated and concentrated to dryness to obtain compound (I) in a crude state.

The crude compound (I) is washed with water, dried in the desiccator, and recrystallized from ethanol, methanol, ethyl acetate or petroleum benzine to obtain the compound (I) in a pure state.

The yield, melting point, specific rotation and reaction conditions, and the elementary analysis of the compound (I) thus produced are shown in Table 1.

TABLE 1

| Compound (II) | Compound (III) | Compound (I) | Reaction time, min. | Yield, percent | Melting point, °C. | Specific rotation in DMF, degrees | Found C | Found H | Found N | Calculated C | Calculated H | Calculated N |
|---|---|---|---|---|---|---|---|---|---|---|---|---|
| Z-alanine | (A) | Z-Ala-O·PCP | 3 | 82 | 175–178 | 1 −17.2 | 43.29 | 2.53 | 3.08 | 43.25 | 2.54 | 2.98 |
| Z-aspartic acid-OBZ | (A) | Z-ASP(OBZ)-O·PCP | 5 | 80 | 126–132 | 1 −16.7 | 49.77 | 2.98 | 2.15 | 49.51 | 2.97 | 2.31 |
| Z-glycine | (A) | Z-Gly-O·PCP | 3 | 85 | 132–134 | | 42.16 | 2.18 | 2.97 | 42.00 | 2.20 | 3.06 |
| Do | (B) | Z-Gly-O·PCP | 20 | 84 | 131–133 | | 42.15 | 2.15 | 3.11 | | | |
| Z-isoleucine | (A) | Z-Ile-O·PCP | 5 | 74 | 122–123 | 1 −14.3 | 46.46 | 3.47 | 2.63 | 46.59 | 3.52 | 2.72 |
| Z-leucine | (A) | Z-Leu-O·PCP | 5 | 78 | 124–125 | 1 −21.3 | 46.61 | 3.45 | 2.79 | 46.59 | 3.52 | 2.72 |
| Do | (B) | Z-Leu-O·PCP | 10 | 81 | 121–124 | 1 −21.5 | 46.50 | 3.34 | 2.65 | | | |
| Di-Z-lysine | (A) | di-Z-Lyo-O·PCP | 3 | 81 | 157–158 | 2 −11.8 | 50.82 | 3.70 | 4.22 | 50.73 | 3.80 | 4.23 |
| Z-phenylalanine | (A) | Z-Phe-O·PCP | 3 | 83 | 156–157 | 1 −51.7 | 50.39 | 2.92 | 2.32 | 50.44 | 2.94 | 2.56 |
| Do | (B) | Z-Phe-O·PCP | 15 | 87 | 154–156 | 1 −52.1 | 50.19 | 2.67 | 2.53 | | | |
| AOC tryptophan | (A) | AOC-Try-O·PCP | 5 | 89 | 160–161.5 | 0 | 49.03 | 3.74 | 4.89 | 48.83 | 3.56 | 4.95 |
| Z-valine | (A) | Z-val-O·PCP | 5 | 85 | 141–142 | 1 −21.7 | 45.76 | 3.07 | 2.59 | 45.67 | 3.23 | 2.80 |
| Do | (B) | Z-val-O·PCP | 20 | 86 | 140–142 | 1 −21.8 | 45.44 | 3.05 | 2.83 | | | |
| Z-glycine-glycine | (A) | Z-gly-gly-O·PCP | 5 | 82 | 168–170.5 | | 42.08 | 2.56 | 5.38 | 41.89 | 2.54 | 5.44 |
| Phenyl acetic acid | (A) | 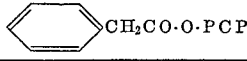 | 5 | 87 | 103–104 | | 43.59 | 1.07 | | 43.73 | 1.83 | |

1 c=1.22.   2 c=1.21.

Remarks.—Z=Benzyloxycarbonyl; OEt=Ethoxy; OBZ=Benzyloxy; AOC=Amyloxycarbonyl; PCP=Pentachlorophenyl. These remarks apply also to Example 2.

EXAMPLE 2

To a solution of 0.01 mol of a compound (II) in 10 to 20 ml. of dimethylformamide, there is added 0.01 mol of triethylamine at 0° to 5° C. To the mixture, there is added 0.01 mol of compound (III) with stirring, and the mixture is then stirred at room temperature for 10 minutes whereupon compound (I) is produced in the reaction mixture.

To the reaction mixture containing the compound (I) are added 0.01 mol of amino acid ester (IV) and 0.01 mol of triethylamine, and the mixture is stirred for one hour at room temperature and is then left standing for 4 to 70 hours.

The reaction mixture is extracted with 150 ml. of ethyl acetate, and the ethyl acetate extract is washed with water, 5% aqueous sodium bicarbonate solution and normal hydrochloric acid, in that order, dehydrated and concentrated to dryness to obtain the peptide compound (V) as shown in the following Table 2.

The yield, melting point, specific rotation and reaction period for peptide formation, and elementary analysis of peptide compound (V) thus prepared are also shown in Table 2.

tallized from aqueous ethanol to obtain 973 mg. of N-t-butoxy-L-alanyl-L-phenylalanyl - L - isoleucylglycine as needles melting at 186 to 187° C. (sinter).

$[\alpha]_D^{23} = -22.0°$ (in dimethylformamide, c.=1.0).

TABLE 2

| Compound (II) | Compound (III) | Compound (I) | Amino acid ester (IV) | Peptide compound (V) | Reaction time (hr.) | Yield, percent | Melting point (° C.) | Specific rotation in DMF, degrees | Elementary analysis, percent | | | | | |
|---|---|---|---|---|---|---|---|---|---|---|---|---|---|---|
| | | | | | | | | | Found | | | Calculated | | |
| | | | | | | | | | C | H | N | C | H | N |
| Z-alanine | (A) | Z-Ala.O.PCP | Gly-OEt | Z-Ala.GlyOEt | 10 | 86 | 98-99 | 1—21.3 | 58.55 | 6.58 | 9.05 | 58.43 | 6.54 | 9.09 |
| Z-glycine | (A) | Z-Gly.O.PCP | Gly-O-BZ | Z-Gly.GlyOBZ | 5 | 88 | 110 | | 64.02 | 5.53 | 7.90 | 64.03 | 5.66 | 7.86 |
| Z-isoleucine | (A) | Z-Ile.O.PCP | Gly-OEt | Z-Ile.GlyOEt | 70 | 86 | 157-158 | 2—26.1 | 61.83 | 7.45 | 7.96 | 61.70 | 7.48 | 8.00 |
| Z-leucine | (A) | Z-Leu.O.PCP | Gly-OEt | Z-Leu.GlyOEt | 10 | 86 | 103.5-104.5 | 3—26.2 | 61.78 | 7.48 | 8.02 | 61.70 | 7.48 | 8.00 |
| Z-phenylalanine | (A) | Z-Phe.O.PCP | Gly-OEt | Z-Phe.GlyOEt | 10 | 83 | 110 | 4—16.8 | 65.85 | 6.27 | 7.01 | 65.61 | 6.29 | 7.29 |
| Do | (B) | Z-Phe.O.PCP | Gly-OEt | Z-Phe.GlyOEt | 10 | 87 | 111 | 3—16.8 | 65.68 | 6.25 | 7.13 | | | |
| Z-valine | (B) | Z-Val.O.PCP | Gly-OEt | Z-Val.GlyOEt | 70 | 73 | 166-167 | 2—25.8 | 60.65 | 7.11 | 8.45 | 60.70 | 7.19 | 8.33 |

1 c=1.22.  2 c=2.21.  3 c=5.21.  4 c=5.22.

See remarks at end of Table 1.

EXAMPLE 3

To a solution of 2.65 g. (0.01 mol) of N-t-butoxy-L-phenylalanine in 10 ml. of dimethylformamide is added 1.4 ml. (0.01 mol) of triethylamine with ice-cooling.

To a mixture, there is added 4.20 g. (0.01 mol) of pentachlorophenyl trichloroacetate, and the whole stirred at room temperature for 10 minutes, whereby pentachlorophenyl N-t-butoxy-L-phenylalanate is produced.

A solution of 4.20 g. (0.01 mol) of trifluoroacetate of benzyl L-isoleucyl-glucinate and 1.4 ml. (0.01 mol) of triethylamine in 20 ml. of dimethylformamide, is added to the above-obtained reaction mixture.

The combined mixture is stirred at room temperature for 10 hours.

To the mixture are added 150 ml. of ethyl aceate and 100 ml. of normal-aqueous ammonia, followed by shaking.

The ethyl acetate layer is separated from the aqueous layer, and is washed with water and 0.2 N-hydrochloric acid, in that order, and concentrated to leave a residue.

The residue is recrystallized from aqueous methanol to obtain 4.25 g. of benzyl (N-t-butoxy-L-phenylalanyl)-L-isoleucylglycinate as needles melting at 151° to 153° C. Yield 80.6%.

$[\alpha]_D^{23} = -15.7°$ (in dimethylformamide, c.=1.0)

*Analysis.*—Found (percent): C, 66.34; H 7.42; N, 7.95. Calculated (percent): C, 66.26; H, 7.48; N, 7.99.

EXAMPLE 4

To a solution of 568 mg. (3 millimols) of N-t-butoxy-L-alanine in 7 ml. of dimethylformamide, there is added 0.42 ml. (3 millimols) of triethylamine with cooling.

To the mixture is added 1.24 g. (3 millimols) of pentachlorophenyl trichloroacetate.

The mixture is stirred at room temperature for 10 minutes, whereupon pentachlorophenyl N-t-butoxy-L-alanate is produced in the reaction mixture.

A solution of 1.58 mg. (3 millimols) of trifluoroacetate of benzyl N-t-butoxy-L-phenylalanyl-L-isoleucylglycinate and 0.42 ml. (3 millimols) of triethylamine in 10 ml. of dimethylformamide, is added to the above-obtained reaction mixture.

The combined mixture is stirred overnight, followed by the same treatment as in Example 3 to obtain 1.31 g. of benzyl (N-t-butoxy-L-alanyl)-L-phenylalanyl-L-isoleucylglycinate as needles melting at 219° to 220° C. Yield 72%.

$[\alpha]_D^{23} = -21.2°$ (in dimethylformamide, c.=1.0).

*Analysis.*—Found (percent): C, 64.46; H, 7.56; N, 9.44. Calculated (percent): C, 64.41; H, 7.43; N, 9.39.

1.194 g. (2 millimols) of benzyl (N-t-butoxy-L-alanyl)-L-phenylalanyl-L-isoleucylglycinate is dissolved in 40 ml. of methanol. The solution is subjected to catalytic reduction for 4 hours employing palladium catalyst.

The catalyst and methanol are removed from the reaction mixture to obtain a residue. The residue is recrys-

*Analysis.*—Found (percent): C, 59.28; H, 7.30; N, 11.21. Calculated (percent): C, 59.30; H, 7.57; N, 11.06.

EXAMPLE 5

To a solution of 506.6 mg. (1 millimol) of N-t-butoxy-L-alanyl-L-phenylalanyl-L-isoleucylglycine in 4 ml. of dimethylformamide, there is added 0.14 ml. of triethylamine. To the mixture is added 412 mg. (1 millimol) of pentachlorophenyl trichloroacetate. The mixture is stirred at room temperature for 30 minutes. To the thus-treated reaction mixture is added water, whereupon precipitates are formed in the reaction mixture.

The precipitates are collected by filtration, washed with water, dried, and then dissolved in 15 ml. of ethanol. The methanol solution is boiled and then cooled to precipitate 710 mg. of pentachlorophenyl (N-t-butoxy-L-alanyl)-L-phenylalanyl-L-isoleucylglycinate as white powder melting at above 270° C. Yield 94%.

*Analysis.*—Found (percent): C, 49,06; H, 4.99; N, 7.31. Calculated (percent): C, 49.31; H, 4.94; N, 7.41.

EXAMPLE 6

To a solution of pentachlorophenyl N-t-butoxy-L-leucinate (which is synthesized by treating oily N-t-butoxy-L-leucine with pentachlorophenyl trichloroacetate as described in Example 1) and 3.3 g. (0.015 mol) of methyl-L-methionate hydrochloride in 20 ml. of dimethylformamide, there is added 2.31 ml. (0.0165 mol) of triethylamine. The mixture is left standing at 0° C. for 4 hours and then at room temperature overnight. The thus-treated mixture is extracted with ethyl acetate. The ethyl acetate extract is washed with normal aqueous ammonia, 0.2 N-hydrochloric acid and water, in that order, and dried over anhydrous sodium sulfate, followed by distilling off the solvent to obtain an oily residue.

The oily residue is dissolved in 200 ml. of methanol saturated with ammonia and the solution is left standing for 4 days, and then the methanol is distilled off from the solution to leave a residue, which is recrystallized from aqueous methanol to obtain 4.9 g. of N-t-butoxy-L-leucyl-L-methionine amide as needles melting at 146° to 147° C. Yield 82%.

$[\alpha]_D^{23} = -38.1°$ (in dimethylformamide, c.=1.0).

*Analysis.*—Found (percent): C, 52.91; H, 8.35; N, 11.79. Calculated (percent): C, 53.17; H, 8.65; N, 11.63.

EXAMPLE 7

604 mg. (0.8 millimol) of pentachlorophenyl N-t-butoxy-L-alanyl-L-phenylalanyl-L-isoleucylglycinate is suspended in 15 ml. of dimethylformamide, followed by heating at 80° C. To the mixture is added 5 ml. of pyridine.

The mixture is rapidly cooled to 30° C. To the thus-treated mixture are added 328 mg. (0.9 millimol) of L-leucyl-L-methionine amide and 0.13 ml. (0.9 millimol) of triethylamine. Thus obtained mixture is kept standing overnight, and water is added thereto a give precipitates. The precipitates are collected by filtration and washed with water and then suspended in 30 ml. of methanol containing 0.1 ml. of acetic acid.

The methanol solution is boiled and then cooled to precipitate 493 mg. of N-t-butoxy-L-alanyl-L-phenylalanyl-L-isoleucyl-L-glycyl - L - leucyl-L-methionine amide melting at 250° to 254° C. (decomposition): Yield 82%. $[\alpha]_D^{23} = -30.6°$ (in dimethylformamide, c.=1.0).

*Analysis.*—Found (percent): C, 57.68; H, 7.86; N, 13.00. Calculated (percent): C, 57.68; H, 7.93; N, 13.07.

On the other hand, in case of adding L-leucyl-L-methionine amide hydrochloride and triethylamine to the resulting mixture prepared by the same manner as in Example 5, the same product as above is produced. Yield 80%.

Reference 1.—Application to synthesis of tetrapeptide having gastrin-like activity (1) Synthesis of L-phenylalanine amide hydrobromide.—To a solution of 29.93 g. (0.1 mol) of N-carbobenzoxy-L-phenylalanine in 120 ml. of dimethylformamide, there is added 14 ml. of triethylamine at 0° to 5° C.

To the mixture is added 4.12 g. of pentachlorophenyl trichloroacetate and the mixture is stirred at room temperature for 5 to 10 minutes, whereupon pentachlorophenyl N-carbobenzoxy-L-phenylalanate is produced in the reaction mixture.

The mixture is cooled to 0° to 5° C., and 10 ml. of concentrated aqueous ammonia is then added thereto. The thus-threated mixture is left standing for 2 hours, and then water is added thereto to precipitate 25.2 g. of N-carbobenzoxy-L-phenylalanine amide melting at 164° C. Yield 84%.

*Analysis.*—Calculated (percent): C, 68.44; H, 6.08; N, 9.34. Found (percent): C, 68.22; H, 6.16; N, 9.11.

25 g. of N-carbobenzoxy-L-phenylalanine amide is suspended in 10 ml. of a 30% solution of HBr in acetic acid, whereupon the crystals first disappear with bubbling, and then needle-like crystals are produced.

The suspension is left standing at room temperature for 40 minutes, followed by adding thereto 200 ml. of dried ether to obtain precipitates.

The precipitates are collected by filtration and washed with ether to obtain 20.5 g. of L-phenylalanine amide hydrobromide melting at 234.5° C. (decomposition). Yield 100%.

(2) Synthesis of L-aspartyl-L-phenylalanine amide.—To a solution of 35.7 g. (0.1 mol) of N-carbobenzoxy-L-aspartic acid β-benzyl-ester in 100 ml. of dimethylformamide, there is added 14 ml. of triethylamine.

To the mixture is added 41.2 g. of pentachlorophenyl trichloroacetate with cooling, and then the mixture is stirred at room temperature for 10 minutes, whereby N-carbobenzoxy-L-aspartic acid β-benzyl - α - pentachlorophenylester is produced in the reaction mixture.

To the mixture are added 24.5 g. of L-phenylalanine amide hydrobromide prepared in Step (1) and 14 ml. of triethylamine.

The thus-treated mixture is stirred at room temperature for 6 hours, and water is added thereto to obtain crystals, which are collected by filtration, washed with water, and then recrystallized from ethanol to obtain 42.5 g. of N - carbobenzoxy-L-β-benzyl-aspartyl-L-phenylalanine amide as needles melting at 171° to 172° C.

$[\alpha]_D^{21} = -22.0 \pm 1°$ (in dimethylformamide, c=1.0).

*Analysis.*—Calculated for $C_{28}H_{29}N_3O_6$ (percent): C, 66.78; H, 5.81; N, 8.35. Found (percent): C, 66.59; H, 5.65; N, 8.49.

40 g. of N-carbobenzoxy-L-β-benzyl-aspartyl-L-phenylalanine amide is dissolved in 800 ml. of 95% acetic acid, followed by catalytic reduction in the presence of 1 g. of palladium catalyst.

The catalyst and the solvent are removed from the reaction mixture to give a residue. The residue is dissolved in a mixture of 150 ml. of water and 150 ml. of acetone while heating and then 1 liter of acetone is added thereto to obtain 13.6 g. of L-aspartyl-L-phenylalanine amide as needles melting at 187° to 188° C. (decomposition). Yield 60%.

(3) Synthesis of L-methionyl-L-aspartyl-L-phenylalanine amide.—To a solution of 5.22 g. (0.02 mol) of t-amyloxycarbonyl-L-methionine in 20 ml. of dimethylformamide and 2.8 ml. of triethylamine, there is added 8.24 g. of pentachlorophenyl trichloroacetate while stirring, and the mixture is then further stirred for 10 to 15 minutes, whereby t-amyloxycarbonyl-L-methionylpentachlorophenylester is produced in the reaction mixture.

To the thus-treated mixture are added 5.85 g. of L-aspartyl-L-phenylalanine amide prepared in Step (2) and 2.4 ml. of triethylamine.

The whole mixture is stirred at room temperature for 6 hours, and then 2 ml. of glacial acetic acid is added thereto.

To the mixture of added cool water to obtain crystals wich are then collected by filtration, washed with water and ether, and recrystallized from 60% aqueous methanol to obtain t-amyloxycarbonyl-L-methionyl-L-aspartyl-L-phenylalanine amide as needles melting at 186.5° C. (decomposition with bubbling). Yield 82%.

$[\alpha]_D^{21} = -37.0 \pm 1°$ (in dimethylformamide, c.=1.0).

*Analysis.*—Calculated for $C_{24}H_{36}N_4O_7S$ (percent): C, 54.95; H, 6.92; N, 10.68. Found (percent): C, 54.69; H, 6.93; N, 10.53.

5.25 g. (0.01 mol) of the above-obtained product is dissolved in 10 ml. of trifluoroacetic acid and then the solution is left standing for 1 hour, and then there is added thereto 100 ml. of dried ether to obtain L-methionyl-L-aspartyl-L-phenylalanine amide.

(4) Synthesis of L-tryptophanyl-L-methionyl-L-aspartyl-L-phenylalanine amide.—To a solution of 3.18 g. (0.01 mol) of t-amyloxy-carbonyl-L-tryptophane in 10 ml. of dimethylformamide, there are added at 0° C. 1.4 ml. of triethylamine and 4.12 g. of pentachlorophenyl trichloroacetate under stirring.

The thus-obtained mixture is further stirred for 10 to 15 minutes at 10° C., whereupon pentachlorophenyl t-amyloxycarbonyl-L-tryptophanate is produced in the reaction mixture.

To the above-obtained mixture are added the L-methionyl-L-aspartyl-L-phenylalanine amide obtained in Step (3) and 2.4 ml. of triethylamine, and the mixture is stirred vigorously at room temperature for 10 hours. 1.5 ml. of glacial acetic acid is added thereto to obtain crystals which are collected by filtration, washed with water, dehydrated, and suspended in warm ethyl acetate.

After cooling, the crystals are collected by filtration, and then recrystallized from 60% methanol to obtain 5.61 g. of t-amyloxycarbonyl-L-tryptophanyl-L-methionyl-L-aspartyl-L-phenylalanine amide as fine needles melting at 218° C. (decomposition). Yield 80%.

$[\alpha]_D^{21} = 31.1 \pm 1°$ (in dimethylformamide, c.=1.0).

*Analysis.*—Calculated for $C_{35}H_{46}N_6O_8S$ (percent): C, 59.68; H, 6.52; N, 11.82. Found (percent): C, 58.84; H, 6.53; N, 11.56.

REFERENCE 2.—APPLICATION TO SYNTHESIS OF GLUTATHIONE (1) Synthesis of N-carbobenzoxy-L-glutamic acid-α-benzyl-γ-pentachlorophenylester.—To a suspension of 55.27 g. (0.1 mol) of N-carbobenzoxy-L-glutamic acid-α-benzylester dicyclohexyl ammonium salt in 150 ml. of dimethylformamide and 30 ml. of pyridine, there is added 41.2 g. (0.1 mol) of pentachorophenyl trichloroacetate at 0° to 5° C.

The mixture is stirred at room temperature for 40 minutes to complete the reaction, and 300 ml. of water is added thereto to obtain crystalline precipitates, which are collected by filtration, washed with water, and then recrystallized from 200 ml. of hot methanol, to obtain 53.0 g. of N-carbobenzoxy-L-glutamic acid-α-benzyl-γ-pentachlorophenylester melting at 143° to 144° C. Yield 85%.

$[\alpha]_D^{23} = -19.6°$ (in dimethylformamide, c.=1.0).

*Analysis.*—Calculated (percent): C, 50.39; H, 3.25; N, 2.26. Found (percent): C, 50.10; H, 3.18; N, 2.16.

(2) Synthesis of ethyl (N-carbobenzoxy-S-benzyl-L-cysteinyl)-glycinate.—To a solution of 34.54 g. (0.1 mol) of N-carbobenzoxy-S-benzylcysteine in 200 ml. of dimethylformamide, there are added 14 ml. (0.1 mol) of triethylamine and 41.2 g. (0.1 mol) of pentachlorophenyl trichloroacetate, and the mixture is stirred vigorously for 5 minutes to obtain precipitates.

The precipitates are dissolved in 300 ml. of chloroform, and then 13.96 g. (0.1 mol) of ethylglycinate hydrochloride and 14 ml. (0.1 mol) of triethylamine dissolved in 300 ml. of chloroform are added thereto.

The solution is stirred at room temperature for 2 hours and concentrated under reduced pressure to remove chloroform. The residue is extracted with ethyl acetate. The extract is washed with normal hydrochloric acid, 4% aqueous sodium bicarbonate solution and water, in that order, dehydrated over sodium sulfate, and concentrated to obtain an oily residue.

To the oily residue is added petroleum benzine to obtain precipitates, which are collected by filtration and recrystallized from ethyl acetate-petroleum benzine to obtain 31.1 g. of ethyl (N-carbobenzoxy-S-benzyl-L-cysteinyl)-glycinate melting at 97° to 99° C.

$[\alpha]_D^{22} = -27.0°$ (in acetic acid, c.=3.0).

*Analysis.*—Calculated (percent): C, 61.38; H, 6.09; N, 6.51. Found (percent): C, 61.14; H, 5.97; N, 6.49.

(3) Synthesis of glutathione.—To 8.16 g. (0.02 mol) of ethyl (N-carbobenzoxy-S-benzyl-L-cysteinyl)-glycinate prepared by Step (2) is added 50 ml. of 25% solution of hydrogen bromide in acetic acid, and the mixture is kept standing for 30 minutes, and then 400 ml. of anhydrous ether is added thereto to obtain an oily substance.

The oily substance is washed twice with anhydrous ether and dried over sodium hydroxide in a desiccator and dissolved in 100 ml. of dimethylformamide.

To the solution is added 3.0 ml. of triethylamine, and then 12.4 g. (0.02 mol) of N-carbobenzoxy-L-glutamic acid - $\alpha$ - benzyl - $\gamma$ - pentachlorophenylester prepared by Step (1).

After the reaction mixture is kept standing overnight, it is extracted with ethyl acetate.

The extract is washed with normal hydrochloric acid, 4% aqueous sodium hydrogencarbonate solution and water, in that order, dried by means of anhydrous sodium sulfate and concentrated to leave a residue, which is crystallized from ethyl acetate to obtain 9.75 g. of N-carbobenzoxy-$\alpha$-benzyl-$\gamma$-L-glutamyl - S - benzyl - L - cysteinyl glycine ethyl-ester melting at 160° to 162° C. Yield 75%.

$[\alpha]_D^{23} = -31.0°$ (in dimethylformamide, c.=1.0).

*Analysis.*—Calculated (percent): C, 62.85; H, 6.05; N, 6.47. Found (percent): C, 62.58; H, 6.06; N, 6.44.

6.5 g. (0.01 mol) of thus-obtained compound is suspended in 40 ml. of acetone, and the suspension is cooled with ice, followed by adding 20 ml. of N-sodium hydroxide thereto.

The mixture is stirred for 2 hours, and then 20 ml. of normal hydrochloric acid is added thereto. The acetone is removed therefrom to leave a residue, which is extracted with ethyl acetate.

The extract is washed with water, dried with sodium sulfate and concentrated under reduced pressure to obtain a residue, to which petroleum benzine is added to give precipitates. The precipitates are crystallized from ethyl acetate-petroleum benzine to obtain 4.8 g. of N-carbobenzoxy-$\gamma$-L-glutamyl-S-benzyl-L-cysteinylglycine as colorless powder crystals melting at 105° to 106° C. Yield 90%.

$[\alpha]_D^{23} = -35.2°$ (in ethanol, c.=1.0)

*Analysis.*—Calculated for $C_{25}H_{29}O_8N_3S$ (percent): C, 56.49; H, 5.48; N, 7.91. Found (percent): C, 56.81; H, 5.49; N, 7.34.

5.3 g. (0.01 mol) of thus-obtained compound is dissolved in 200 ml. of liquid ammonia, and the solution is cooled to $-50°$ to $-60°$ C., after which 1.8 g. (0.08 mol) of metallic sodium is thereto added intermittently in several portions with vigorous stirring.

After the resultant reduction, 12 g. of ammonium acetate is added to the reaction mixture, followed by stirring for 20 minutes to give a colorless solution.

Liquid ammonia is evaporated from the solution to leave a residue, which is cooled with ice and then dissolved in 125 ml. of 2 N-sulfuric acid.

The solution is washed with ether and then heated to 40° to 50° C., whereupon 0.72 g. (0.05 mol) of copper oxide is added to precipitate white copper salt.

After cooling, the precipitates of the copper salt are collected by centrifugation, washed with water, and suspended in a small amount of water. Into the suspension is introduced hydrosulfide gas to precipitate copper sulfide, which is then filtered off.

Glutathione is obtained by concentration of the obtained liquor in a crude state, followed by crystallization from a mixture of water and ethanol, to obtain glutathione showing the same properties as those of an authentic sample.

Having thus disclosed the invention, what is claimed is:

1. A method for producing an active carboxylic acid ester, which comprises contacting (a) a carboxylic acid R—COOH, in which each radical attached to the carbon atom of the $\alpha$-position is weaker than Cl in electronegativity and which is selected from the group consisting of (1) a hydrocarbon-carboxylic acid having at most 20 carbon atoms, (2) an N-protected amino acid and (3) a peptide in which the terminal amino is protected, with (b) a chlorinated acetic acid ester of the formula:

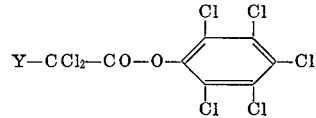

wherein Y stands for H or Cl, in the presence of a tertiary amine having at most 15 carbon atoms or dicyclohexylamine in an inert organic solvent whereby the corresponding carboxylic acid ester of the formula:

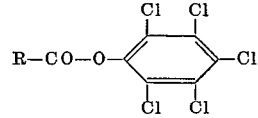

wherein R—CO— is an acyl of a carboxylic acid defined as above, is produced.

2. The method as claimed in claim 1, wherein the carboxylic acid is N-protected amino acid.

3. The method as claimed in claim 1, wherein the tertiary amine is trialkylamine.

4. The method as claimed in claim 3, wherein the trialkylamine is triethylamine.

5. A method according to claim 1 wherein the reaction is carried out at a temperature up to about 25° C.

6. A method according to claim 5 wherein the reaction time is between 2 minutes and about 3 hours.

7. A method according to claim 1 wherein the reactants are present in equimolar amounts.

References Cited

Broadbent et al.: J. Chem. Soc. (C) 2632 (1967).

JAMES A. PATTEN, Primary Examiner

U.S. Cl. X.R.

260—309.6, 326 A, 326.14 R, 326.14 T, 326.3, 408, 470, 471 A, 471 C, 476 R, 479 R, 999